US006460679B1

(12) United States Patent
Stuffel et al.

(10) Patent No.: US 6,460,679 B1
(45) Date of Patent: Oct. 8, 2002

(54) AUTOMATICALLY ADJUSTING ESCALATOR HANDRAIL SYSTEM

(75) Inventors: Andreas Stuffel, Porta Westfalita (DE); Uwe Hauer, Nienburg (DE); Dirk Gerdau, Hohenhorst (DE)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 09/678,995

(22) Filed: Oct. 4, 2000

(51) Int. Cl.[7] .......................... B65G 23/24; B66B 23/22
(52) U.S. Cl. ....................................... 198/337; 198/336
(58) Field of Search ................................ 198/329, 335, 198/336, 337

(56) References Cited

U.S. PATENT DOCUMENTS 3,651,919 A * 3/1972 Vollmer ...................... 198/336
4,562,914 A * 1/1986 Boltrek ....................... 198/336
4,564,099 A * 1/1986 Uozomi .................. 198/336 X
4,875,568 A * 10/1989 Hermann et al. ....... 198/335 X
4,895,240 A * 1/1990 Breuhl et al. ........... 198/331 X
5,125,494 A * 6/1992 Nurnberg et al. ....... 198/331 X
5,188,209 A * 2/1993 Johnson et al. ............. 198/336
5,207,308 A * 5/1993 Sheffield et al. ............ 198/336
5,427,221 A * 6/1995 Spriggs et al. .......... 198/335 X
5,782,333 A 7/1998 Pitts

FOREIGN PATENT DOCUMENTS

FR 1484075 A 6/1967
JP 10101285 4/1998

OTHER PUBLICATIONS

International Search Report mailed Apr. 18, 2002.

* cited by examiner

*Primary Examiner*—Christopher P. Ellis
*Assistant Examiner*—Gene O. Crawford

(57) ABSTRACT

A passenger conveyor system includes a handrail adjustment mechanism that automatically adjusts the forces imposed on the handrail. A first length compensation device is positioned on a first side of the handrail drive mechanism. A second length compensation device is positioned on a second side of the handrail drive mechanism. Depending on the direction of handrail movement, one of the two length compensation devices imposes an automatically adjustable amount of tension on the handrail to maintain a desired effective length of the handrail. The length compensation device located on the slack side of the handrail compensates the handrail length by imposing a minimized tension on the handrail. The length compensation device located on the load side of the handrail will be lifted because the traction in the handrail caused by the drive mechanism overcomes any stretch imposed by the length compensation device on the load side.

23 Claims, 3 Drawing Sheets

AUTOMATICALLY ADJUSTING ESCALATOR HANDRAIL SYSTEM

BACKGROUND OF THE INVENTION

This invention generally relates to passenger conveyors. More particularly, this invention relates to a device for automatically adjusting the length of a passenger conveyor handrail.

Passenger conveyors typically include a plurality of steps that move in a continuous pattern along a pathway to carry passengers from one landing to another. A handrail typically includes a steel-reinforced belt that travels along side the steps. A drive mechanism typically moves the handrail belt so that it travels along the pathway at the same speed as the steps.

One challenge presented by such handrail assemblies is maintaining an appropriate length of the handrail belt to achieve smooth operation. Common practice has been to provide a single length compensation station on one side of the handrail drive mechanism. While these tension stations have proven useful, they are not without shortcomings and drawbacks.

One major shortcoming of conventional length compensation stations is that they must be manually set to a desired length. Therefore, conventional arrangements cannot accommodate changes in handrail length caused by temperature variations, for example. This requires a mechanic to manually adjust the tension and, therefore, the effective length of the handrail multiple times over the life of the system.

Another conventional arrangement is to use a single tension station to maintain the length of the handrail automatically. The tension station provides a single tension force regardless of which direction the handrail is moving. The force to the handrail must be high enough to bias the handrail (i.e., to maintain the appropriate length) even if the location of the tension station is on the load side of the drive mechanism. This kind of length compensation system is not optimum due to the increased tension on the handrail, which causes heat buildup, undesirable wear and increased power consumption.

There is a need for an improved handrail adjusting device that automatically adjusts the length of the handrail and is responsive to changes caused by temperature variations or a change in the direction of movement of the handrail. This invention provides such a solution and overcomes the shortcomings and drawbacks discussed above.

SUMMARY OF THE INVENTION

In general terms, this invention is an automatically adjustable device that provides length compensation for a passenger conveyor handrail to maintain a desired effective length of the handrail. A system designed according to this invention includes a handrail and a drive mechanism that moves the handrail in a selected direction. A first length compensation device is provided on a first side of the drive mechanism that compensates handrail length when the drive mechanism moves the handrail in a first direction. A second length compensation device is positioned on a second side of the drive mechanism that compensates handrail length when the drive mechanism moves the handrail in a second direction.

In one example, the length compensation devices each have a spring loaded arm that bias the handrail between handrail guides such that the effective length of the handrail is adjusted. The tension provided by the spring loaded arm preferably is small enough so that it is automatically overcome whenever the handrail is moved in an opposite direction.

The various features and advantages of the invention will become apparent to those skilled in the art from the following detailed description of the currently preferred embodiments. The drawings accompanying the detailed description can be briefly described as follows.

DETAILED DESCRIPTION OF THE PREFERRED EMBODIMENT

Figure 1:
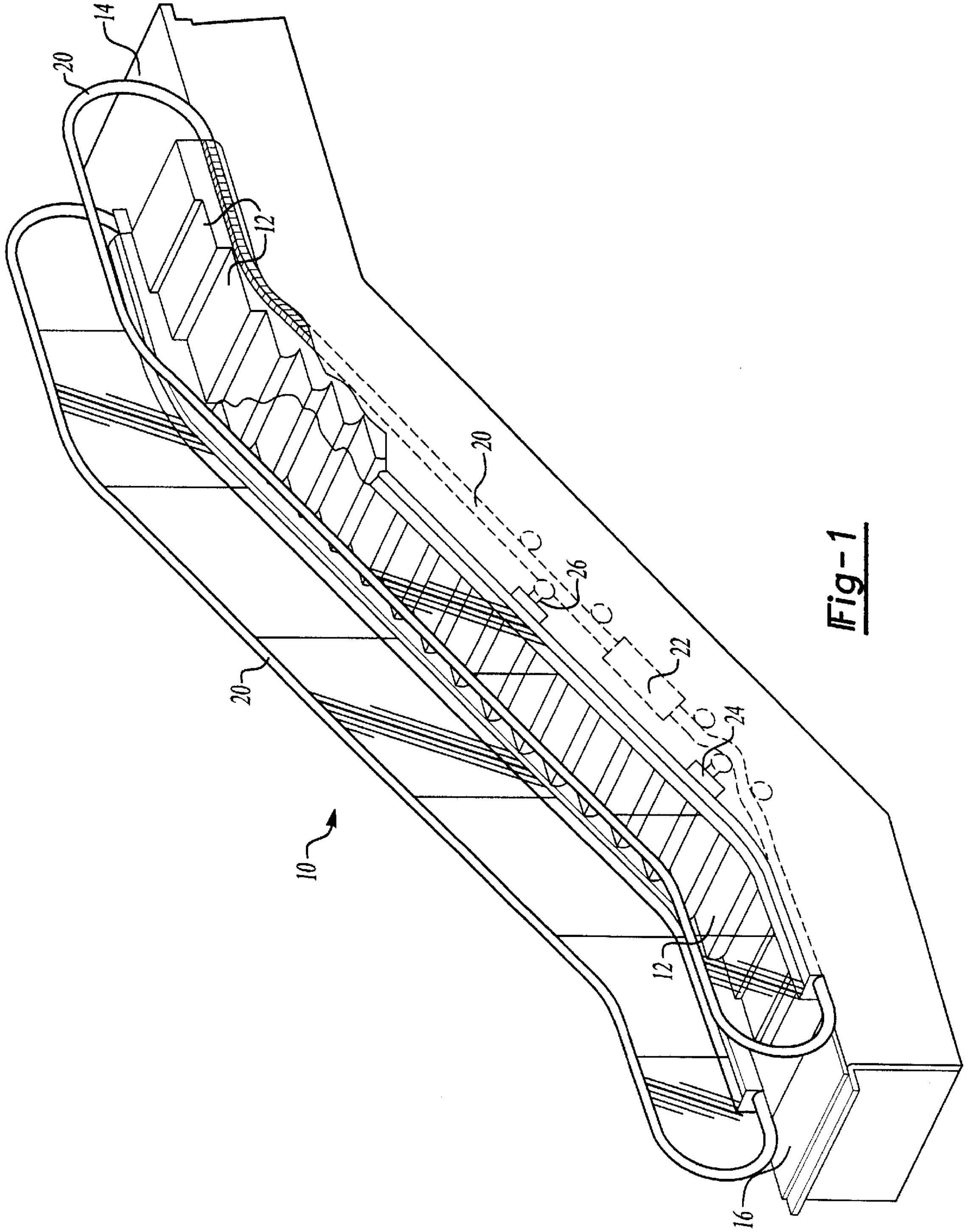
FIG. 1 is diagrammatically illustrates an escalator system designed according to this invention.

A passenger conveyor system 10 includes a plurality of steps 12 that move between landings 14 and 16 in a conventional fashion. A handrail 20 moves along with the steps 12 so that a passenger can brace them self as they are moved by the escalator 10. The handrail 20 preferably includes a conventional steel-reinforced rubber belt. A conventional handrail drive mechanism 22 propels the handrail 20 along the escalator pathway in a conventional manner. Drive mechanism 22 preferably is capable of moving the handrail 20 in two opposite directions.

Although an escalator system is illustrated and described in this specification, this invention is not limited to escalators. This invention is equally applicable to passenger conveyor systems such as moving walkways.

The passenger conveyor system 10 includes a first length compensation device 24 on one side of the drive mechanism 22. A second length compensation device 26 is provided on a second side of the drive mechanism 22. Providing length compensation devices on both sides of the drive mechanism 22 represents a significant departure from previous handrail control systems. Further, the length compensation devices 24 and 26 are automatically adjustable to accommodate variations in the handrail length without requiring manual adjustments.

Figure 2:
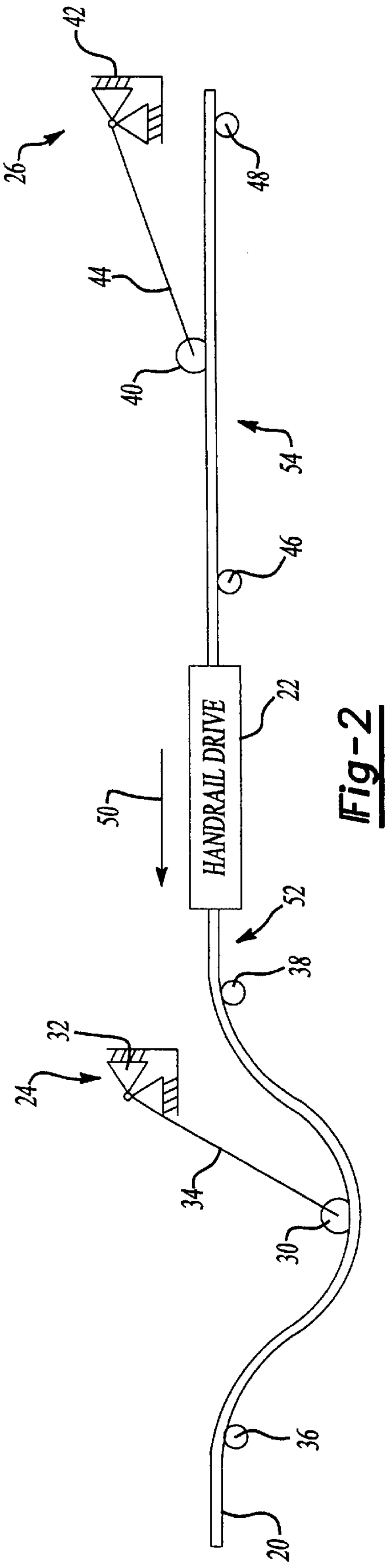
FIG. 2 schematically illustrates selected components of the embodiment of FIG. 1.
Figure 3:
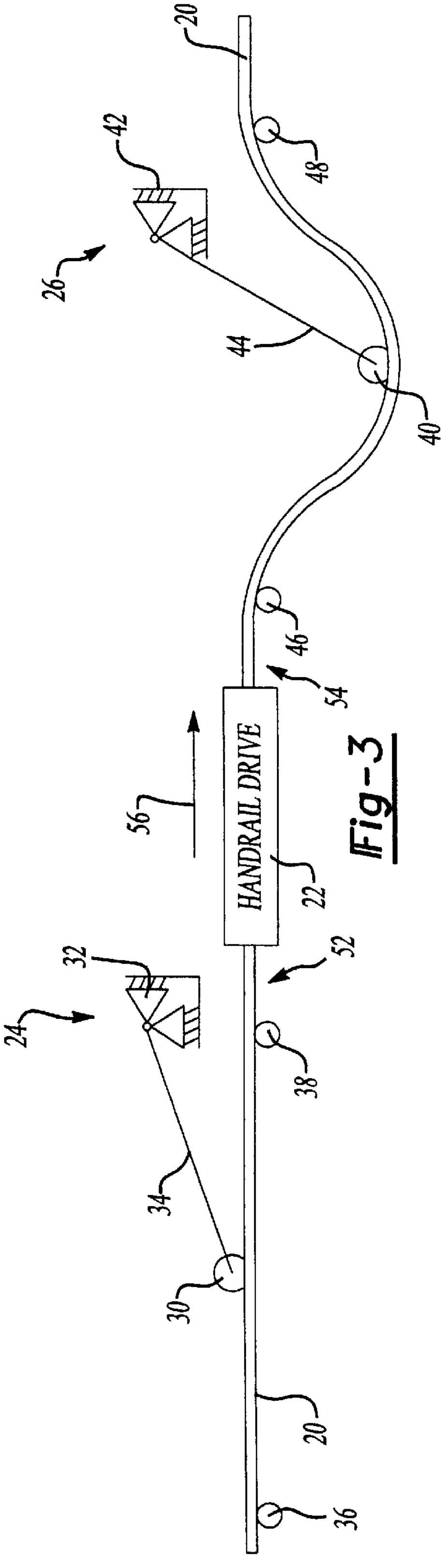
FIG. 3 illustrates the selected components of FIG. 2 in another operating condition.

As best seen in FIGS. 2 and 3 the first length compensation device 24 includes an engaging member 30 that engages one side of the handrail. A support structure 32 supports the arm 34, which in turn supports the engaging member 30. In one example, the arm 34 is spring loaded and provides a force in a direction away from the support structure 32 so that the engaging member 30 biases the handrail 20 away from the support structure 32. Guide members 36 and 38 preferably are spaced and positioned so that the engaging member 30 engages the handrail 20 between the guide members 36 and 38. The force imposed by the first length compensation device 24 biases the handrail downward (according to the drawing) between the guide members 36 and 38 to adjust the effective length of the handrail 20. In one example, the engaging member 30 and the guide members 36 and 38 include rollers.

The second length compensation device 26 preferably is structurally identical with the first length compensation device 24. The second length compensation device 26 includes a handrail engaging member 40 supported by a support structure 42 and a support arm 44. Two handrail guide members 46 and 48 preferably are positioned so that the engaging member 40 biases the handrail 20 downward (according to the drawings) between the handrail guide members 46 and 48.

FIG. 2 illustrates the handrail drive mechanism 22 moving the handrail in a first direction shown by the arrow 50. The first length compensation device 24 is positioned on a first side 52 of the drive mechanism 22. The second length compensation device 26 is positioned on a second side 54 of the drive mechanism 22. When the drive mechanism 22 moves the handrail in the first direction, the first side 52 of the drive mechanism 22 is the slack side of the handrail 20. Accordingly, the length compensation device 24 preferably imposes a force on the handrail 20 under these conditions. The engaging member 30 preferably biases the handrail 20 downward (according to the drawings) between the handrail guides 36 and 38. The force imposed by the first length compensation device 24 preferably is just great enough to alter the effective length of the handrail 20 to maintain a smooth handrail operation.

Under the operating conditions illustrated in FIG. 2, the force provided by the second tension device 26 preferably is small enough so that the drive mechanism force imposed on the load side of the handrail 22 (i.e., the second side 54) stretches the handrail automatically, overcoming the handrail bending imposed by the force of the second length compensation device 26.

FIG. 3 illustrates the handrail drive mechanism 22 moving the handrail 20 in a second direction shown by the arrow 56. In this instance, the first side 52 of the handrail 20 is the load side while the second side 54 is the slack side. The first length compensation device 24 no longer provides a force that is used to compensate the length of the handrail 20. The force on the load side (i.e., the first side 52) of the handrail 20 imposed by the handrail drive mechanism 22 preferably is sufficient to overcome the bending imposed by the first length compensation device 24. On the slack side, the second length compensation device 26 imposes a force on the handrail 20 to adjust the effective length of the handrail 20. The engaging member 40 preferably biases the handrail 20 downward (according to the drawings) between the handrail guide members 46 and 48. The force imposed by the second length compensation device 26 preferably is minimized and just great enough to adjust the effective length of the handrail 20 as needed.

Not only are the length compensation devices 24 and 26 automatically adjustable by reversing the direction of movement of the handrail (as schematically illustrated in FIGS. 2 and 3), but each device is automatically adjustable in response to environmental conditions. For example, temperature changes can cause the length of the handrail 20 to expand or shrink, in part, because of the presence of the steel reinforcements within the belt. The forces imposed by the length compensation devices 24 and 26 preferably are low enough to allow automatic length adjustment of the handrail 20 in response to such expansion or contraction of the handrail.

Figure 4:
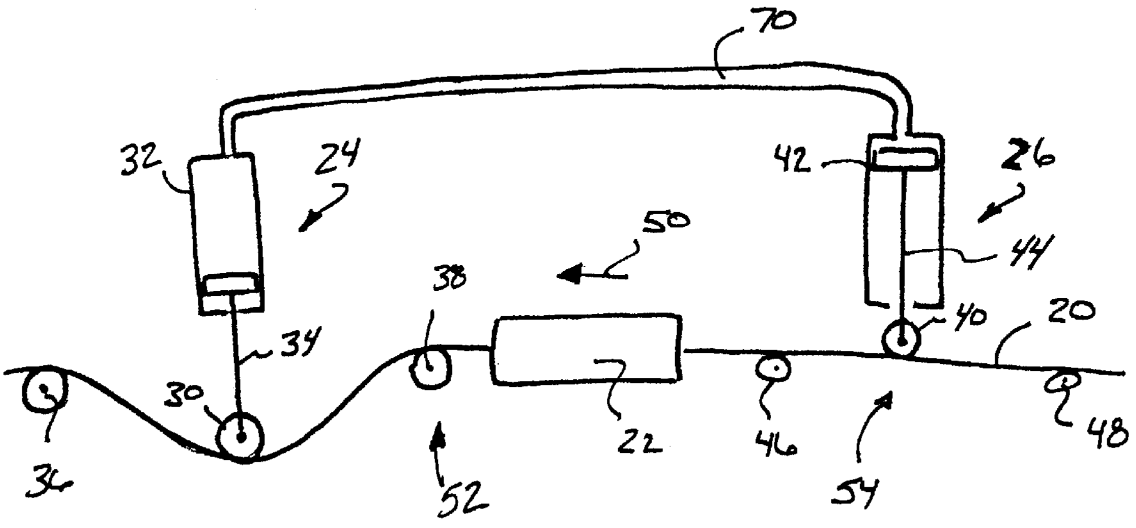
FIG. 4 schematically illustrates another embodiment of this invention.

In one example, the support arms 34 and 44 are weighted so that the force of gravity and the weight imposes the desired force on the handrail 20 as needed. In another example, the support arms 34 and 44 are spring loaded so that a biasing force is imposed on the handrail in the direction away from the support structure 32 and 42, respectively. Another example is shown in FIG. 4. In this example, fluid pressure within a conduit 70 provides the force for adjusting the handrail length. Pneumatic or hydraulic arrangements are within the scope of this invention. Additionally, combinations of mechanical and fluid-based arrangements are possible.

This invention provides a substantial advancement in the control and maintenance of handrails and passengers conveyor systems. Having two automatically adjustable length compensation devices eliminates the need for manual adjustments in the event that the direction of handrail movement is changed. Further, the automatically adjustable length compensation devices accommodate changes in the length of the handrail caused by environmental factors or changes over time.

Given this description, those skilled in the art will be able to choose appropriate weights or spring-loaded arrangements to realize a desired length compensation force for a given situation. Additionally, those who have the benefit of this description will be able to choose from among structural components for realizing the length compensation devices 24 and 26.

The preceding description is exemplary rather than limiting in nature. Variations and modifications to the disclosed examples may become apparent to those skilled in the art that do not necessarily depart from the purview and spirit of this invention. The scope of legal protection given to this invention can only be determined by studying the following claims.

We claim:

1. A passenger conveyor system, comprising: a handrail;

a drive mechanism that engages the handrail for moving the handrail in a chosen direction;

a first length compensation device on a first side of the drive mechanism that provides length compensation of the handrail when the drive mechanism moves the handrail in a first direction; and a second length compensation device on a second side of the drive mechanism that provides length compensation of the handrail when the drive mechanism moves the handrail in a second direction, the first and second length compensation devices operating independently of each other.

2. The system of claim 1, wherein the first and second length compensation devices are automatically adjusted responsive to the direction of movement of the handrail.

3. The system of claim 1, wherein a length compensation effect imposed by the force of the first length compensation device is automatically removed when the drive mechanism moves the handrail in the second direction.

4. The system of claim 1, wherein the a length compensation effect imposed by the force of the second length compensation device is automatically removed when the drive mechanism moves the handrail in the first direction.

5. The system of claim 1, wherein at least one of the first or second length compensation devices includes a spring that biases the handrail in a manner that adjusts an effective length of the handrail.

6. The system of claim 1, wherein at least one of the first or second length compensation devices includes a weight that biases the handrail in a manner that adjusts an effective length of the handrail.

7. The system of claim 1, wherein a driving force imposed by the drive mechanism is great enough to stretch the handrail against a force imposed by the length compensation devices such that a deflection of the handrail imposed by the first length compensation device is automatically removed when the drive mechanism moves the handrail in the second direction and a deflection of the handrail imposed by the second length compensation device is automatically removed when the drive mechanism moves the handrail in the first direction.

8. The device of claim 1, wherein the first length compensation device is longitudinally spaced from where the drive mechanism engages the handrail.

9. The device of claim 1, wherein the second length compensation device is longitudinally spaced from where the drive mechanism engages the handrail.

10. The system of claim 1, wherein each length compensation device includes an engaging member that engages one side of the handrail and two guide members positioned on an opposite side of the handrail such that the engaging member is located between the guide members and the handrail is deflected toward the opposite side.

11. The system of claim 10, wherein each engaging member is moveable relative to the two guide members such that the tension imposed by each tension device is automatically adjustable.

12. The system of claim 11, wherein each engaging member comprises a roller.

13. A method of automatically adjusting a length of a handrail of a passenger conveyor having a drive mechanism that selectively moves the handrail in a first direction away from a first side of the drive mechanism or a second direction away from a second side of the drive mechanism, comprising the steps of:

(A) providing a length compensation device on a first and second side of the drive mechanism that operate independently of each other;

(B) automatically compensating the length of the handrail on the first side of the drive mechanism when the drive mechanism moves the handrail in the first direction; and (C) automatically compensating the length of the handrail on the second side of the drive mechanism when the drive mechanism moves the handrail in the second direction.

14. The method of claim 13, including automatically adjusting the length compensation of step (A) or step (B) to automatically maintain a desired length of the handrail.

15. The method of claim 13, including automatically releasing the length compensation of step (B) when performing step (A).

16. The method of claim 13, including automatically releasing the length compensation of step (A) when performing step (B).

17. The method of claim 13, including performing step (A) on a portion of the handrail that is longitudinally spaced from where the drive mechanism engages the handrail.

18. The method of claim 13, including performing step (B) on a portion of the handrail that is longitudinally spaced from where the drive mechanism engages the handrail.

19. A passenger conveyor system, comprising:

a handrail;

a drive mechanism for moving the handrail in a chosen direction;

a first length compensation device on a first side of the drive mechanism that provides length compensation of the handrail when the drive mechanism moves the handrail in a first direction; and a second length compensation device on a second side of the drive mechanism that provides length compensation of the handrail when the drive mechanism moves the handrail in a second direction wherein at least one of the first or second length compensation devices includes a weight that biases the handrail in a manner that adjusts an effective length of the handrail.

20. A passenger conveyor system, comprising:

a handrail;

a drive mechanism for moving the handrail in a chosen direction;

a first length compensation device on a first side of the drive mechanism that provides length compensation of the handrail when the drive mechanism moves the handrail in a first direction, including an engaging member that engages one side of the handrail and two guide members positioned on an opposite side of the handrail such that the engaging member is located between the guide members and the handrail is deflected toward the opposite side; and a second length compensation device on a second side of the drive mechanism that provides length compensation of the handrail when the drive mechanism moves the handrail at a second direction.

21. The system of claim 20, wherein the second length compensation device includes an engaging member that engages one side of the handrail and two guide members positioned on an opposite side of the handrail such that the engaging member is located between the guide members and the handrail is deflected toward the opposite side.

22. The system of claim 21, wherein each engaging member is moveable relative to the two corresponding guide members such that the tension imposed by each tension device is automatically adjustable.

23. The system of claim 22, wherein each engaging member comprises a rolled.

* * * * *